(12) United States Patent
Ando

(10) Patent No.: US 6,359,860 B1
(45) Date of Patent: Mar. 19, 2002

(54) CONNECTION SWITCHING METHOD AND APPARATUS

(75) Inventor: Naoki Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/098,414

(22) Filed: Jun. 16, 1998

(30) Foreign Application Priority Data

Jun. 16, 1997 (JP) .............................................. 9-172737

(51) Int. Cl.[7] .............................................. H04L 12/26
(52) U.S. Cl. ........................ 370/223; 370/228; 370/244; 370/252
(58) Field of Search ................................ 370/217, 218, 370/216, 220, 225, 228, 244, 242, 250, 252, 221, 222, 223, 224, 330, 335; 320/248

(56) References Cited

U.S. PATENT DOCUMENTS

| | | | | |
|---|---|---|---|---|
| 5,150,356 A | * | 9/1992 | Tsutsui | 370/223 |
| 5,239,537 A | * | 8/1993 | Sakauchi | 370/218 |
| 5,241,534 A | * | 8/1993 | Omuro et al. | 370/218 |
| 5,268,909 A | * | 12/1993 | Loebig | 370/49.1 |
| 5,345,438 A | * | 9/1994 | Ozaki | 370/220 |
| 5,365,511 A | * | 11/1994 | Kusano | 370/244 |
| 5,636,204 A | * | 6/1997 | Mizuno et al. | 370/245 |
| 5,781,528 A | * | 7/1998 | Sato et al. | 370/218 |
| 5,867,481 A | * | 2/1999 | Miyagi | 370/392 |
| 6,041,037 A | * | 3/2000 | Nishio et al. | 370/228 |

FOREIGN PATENT DOCUMENTS

JP 5-91103 4/1993

\* cited by examiner

*Primary Examiner*—Ricky Ngo
*Assistant Examiner*—Phuc Tran
(74) *Attorney, Agent, or Firm*—Young & Thompson

(57) ABSTRACT

According to a connection switching method of a switch for selectively setting a connection path between a plurality of input lines and a plurality of output lines, the types of faults which may occur on the input lines are defined. Connection destination information indicating connection states of the switch are stored in accordance with the types of faults. The type of fault is specified on the basis of the defined types of faults when a fault occurs on an input line. Connection destination information corresponding to the specified type of fault is read out. The connection state of the switch is switched on the basis of the readout connection destination information. A connection switching apparatus is also disclosed.

12 Claims, 6 Drawing Sheets

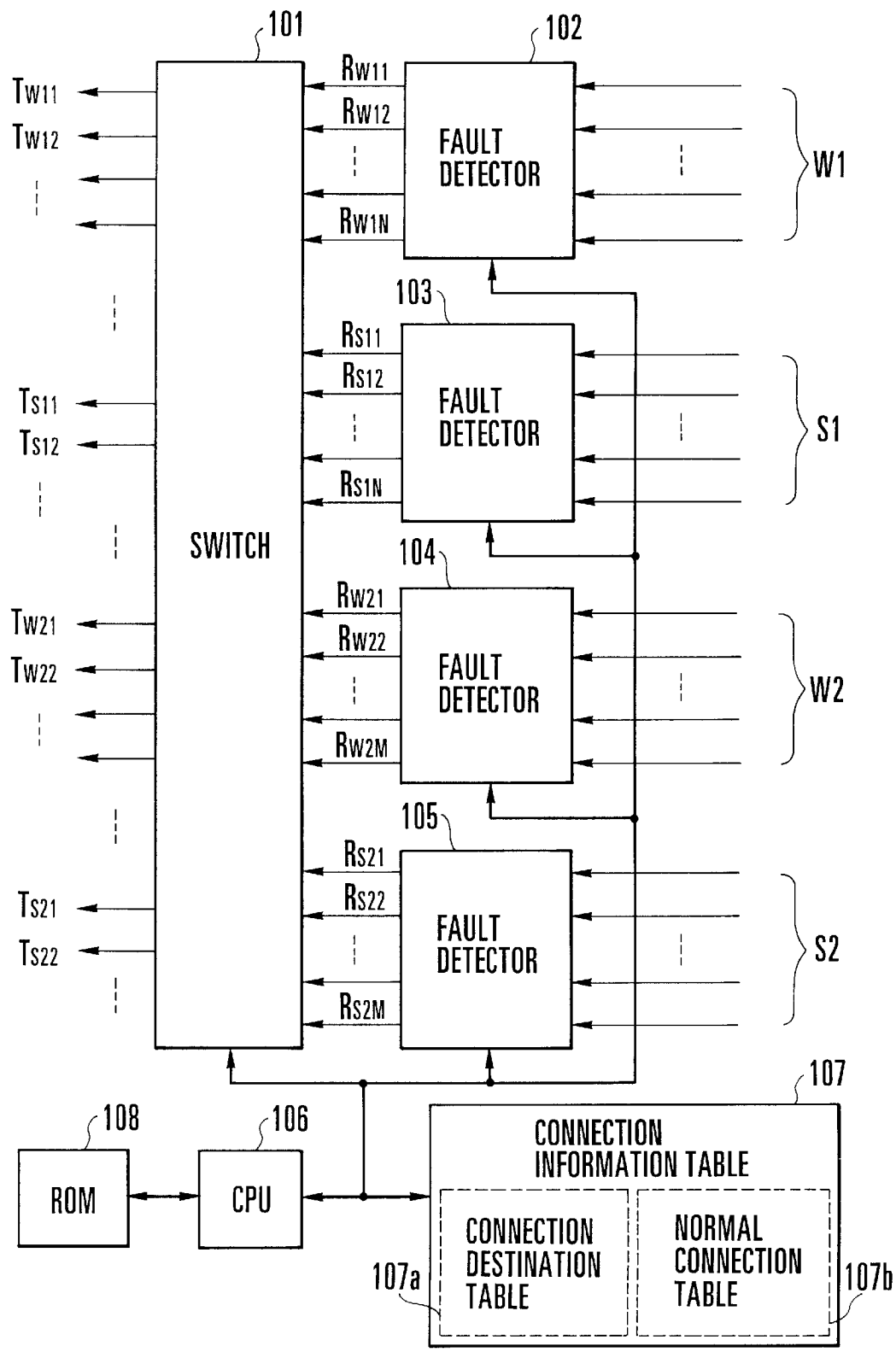
F I G. 2

| PLANE NUMBER | CONNECTION TYPE #1 | CONNECTION TYPE #2 | CONNECTION TYPE #3 | CONNECTION TYPE #4 |
|---|---|---|---|---|
| #0 | NORMAL CONNECTION | NORMAL CONNECTION | NORMAL CONNECTION | NORMAL CONNECTION |
| #1 | CONNECTION DEFINITION TABLE FOR FAULT 1 | CONNECTION DEFINITION TABLE FOR FAULT 1 | CONNECTION DEFINITION TABLE FOR FAULT 1 | CONNECTION DEFINITION TABLE FOR FAULT 1 |
| #2 | CONNECTION DEFINITION TABLE FOR FAULT 2 | CONNECTION DEFINITION TABLE FOR FAULT 2 | CONNECTION DEFINITION TABLE FOR FAULT 2 | CONNECTION DEFINITION TABLE FOR FAULT 2 |
| --- | --- | --- | --- | --- |
| --- | --- | --- | --- | --- |
| --- | --- | --- | --- | --- |
| --- | --- | --- | --- | --- |
| #7 | CONNECTION DEFINITION TABLE FOR FAULT 7 | CONNECTION DEFINITION TABLE FOR FAULT 7 | CONNECTION DEFINITION TABLE FOR FAULT 7 | CONNECTION DEFINITION TABLE FOR FAULT 7 |
| #8 | CONNECTION DEFINITION TABLE FOR FAULT 8 | CONNECTION DEFINITION TABLE FOR FAULT 8 | CONNECTION DEFINITION TABLE FOR FAULT 8 | CONNECTION DEFINITION TABLE FOR FAULT 8 |
| --- | --- | --- | --- | --- |

F I G. 4

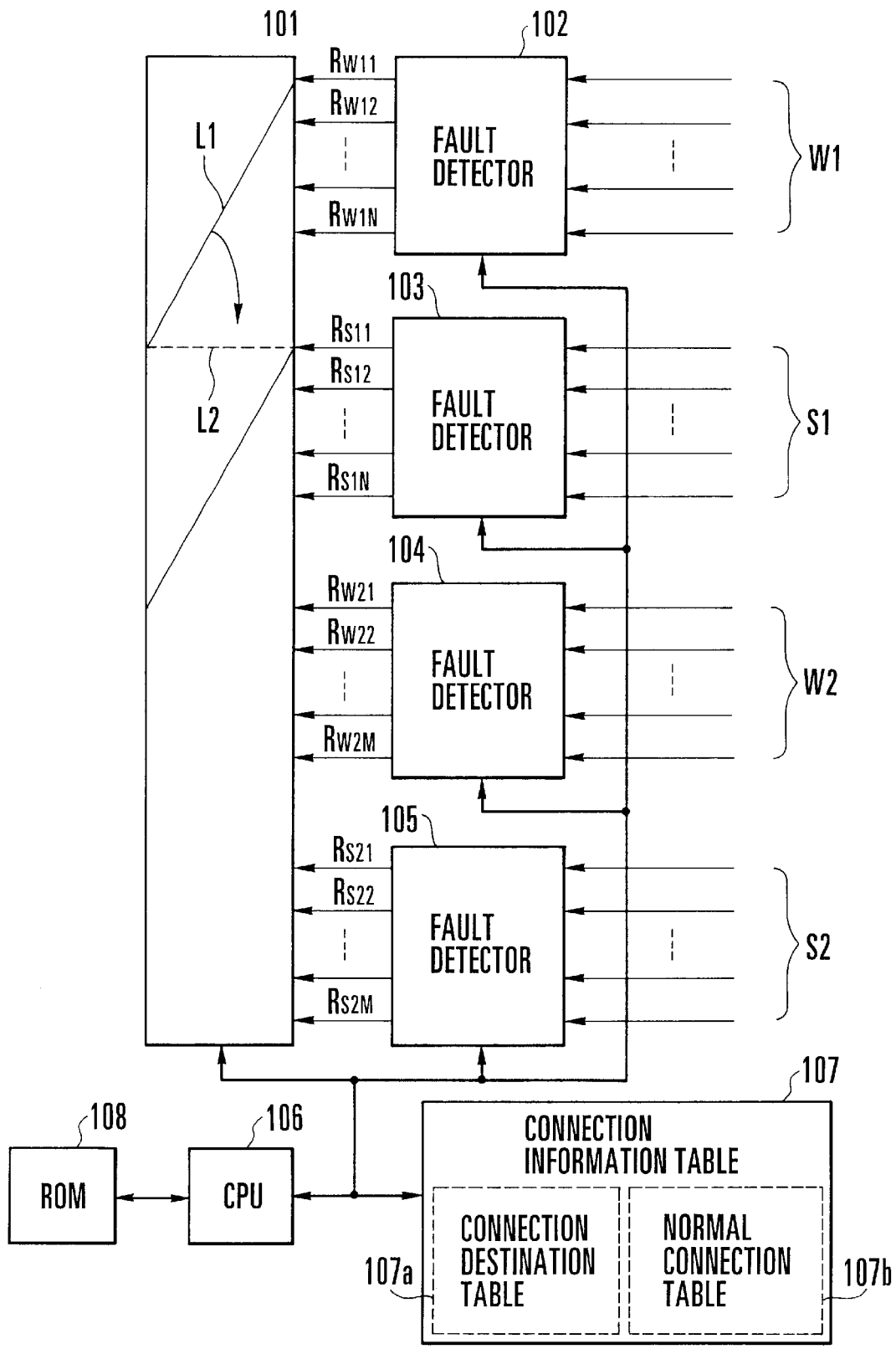
F I G. 6

US 6,359,860 B1

CONNECTION SWITCHING METHOD AND APPARATUS

BACKGROUND OF THE INVENTION

The present invention relates to connection switching at a node constituting a network and, more particularly, to a connection switching method and apparatus upon occurrence of a fault.

In a ring network constituted by connecting a plurality of nodes in a loop, a signal identical to a normal transmission signal is generally transmitted as a spare signal in the same direction. When a fault occurs on a normal line between certain nodes, the connection between these nodes is switched to a spare line to avoid signal disconnection. This connection switching is performed by a switch, e.g., a cross-connection apparatus arranged at the node.

Conventional cross-connection switching control is described in a firmware program. Every time connection must be switched upon occurrence of a fault, the program must be activated to calculate a connection switching destination. Particularly when a plurality of faults occur, the program is executed for each fault, a long time is required to complete the connection, and connection cannot be switched at a high speed. In some cases, connection is transiently switched.

Further, programs equal in number to the types of faults are necessary. If multiple faults occur, the program repetitively branches and recurs, and the control flow cannot be theoretically grasped. Accordingly, bugs may be included in the firmware program.

SUMMARY OF THE INVENTION

It is an object of the present invention to provide a switching method and apparatus capable of completing connection switching within a short time.

It is another object of the present invention to provide a switching method and apparatus capable of achieving high-speed connection switching even upon occurrence of multiple faults.

It is still another object of the present invention to provide a switching method and apparatus capable of easily grasping the switching control flow even upon occurrence of multiple faults.

In order to achieve the above objects, according to the present invention, there is provided a connection switching method of a switch for selectively setting a connection path between a plurality of input lines and a plurality of output lines, comprising the steps of defining the types of faults which may occur on the input lines, storing connection destination information indicating connection states of the switch in accordance with the types of faults, specifying the type of fault on the basis of the defined types of faults when a fault occurs on an input line, reading out connection destination information corresponding to the specified type of fault, and switching the connection state of the switch on the basis of the readout connection destination information.

BRIEF DESCRIPTION OF THE DRAWINGS

FIG. 2 is a block diagram of a node shown in FIG. 1;

FIG. 4 is a schematic view of a table storing information serving as a base for forming the connection destination table shown in FIG. 3;

FIG. 6 is a view for explaining the operation of a switch shown in FIG. 2 in detail.

DESCRIPTION OF THE PREFERRED EMBODIMENT

The present invention will be described in detail below with reference to the accompanying drawings.

Figure 1:
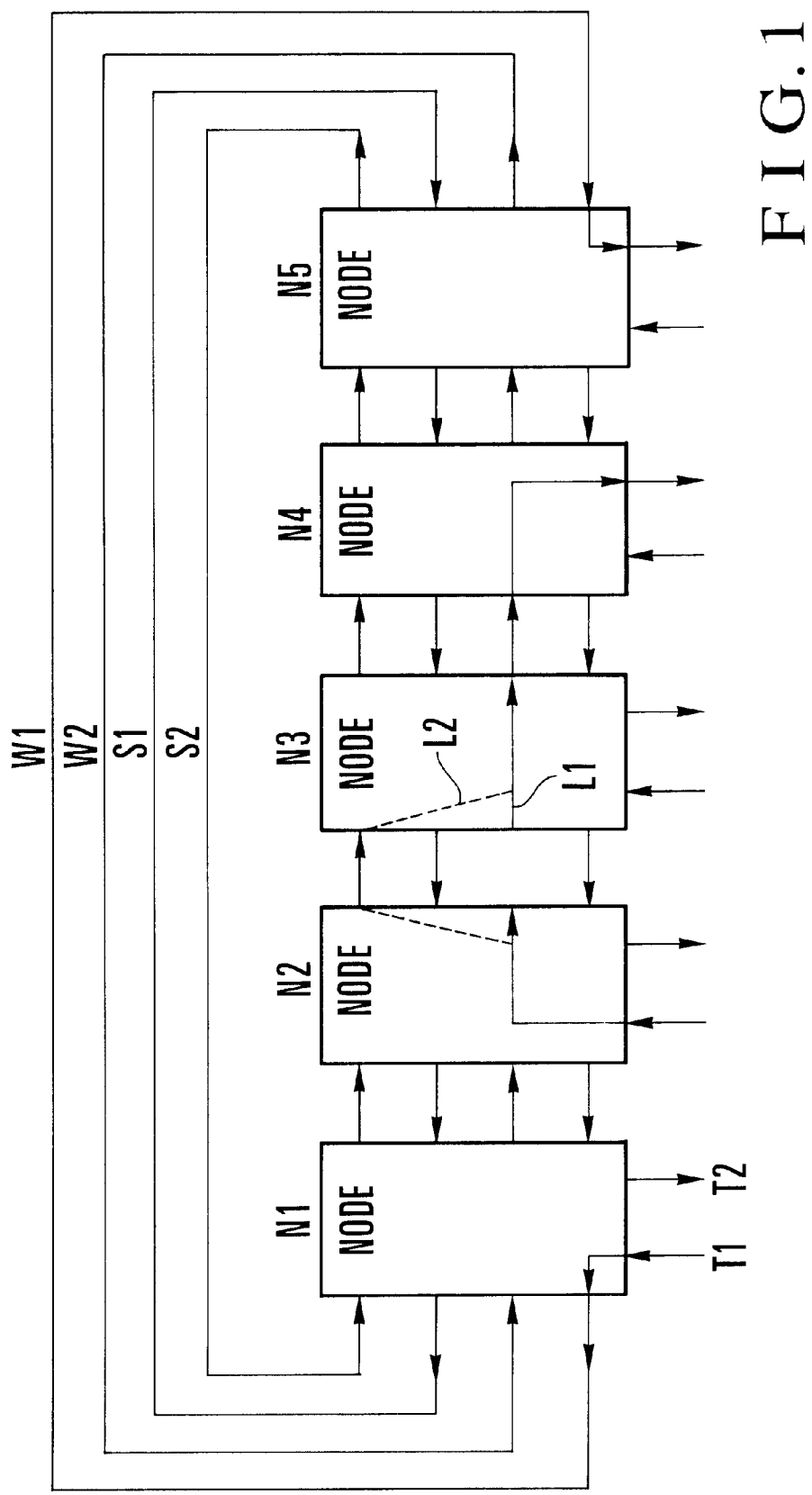
FIG. 1 is a block diagram schematically showing a ring network according to an embodiment of the present invention.

FIG. 1 schematically shows a ring network according to an embodiment of the present invention. For the sake of descriptive simplicity, assume a ring network constituted by connecting five nodes N1 to N5 having the same arrangement in a loop. These nodes N1 to N5 are connected by a clockwise line W1 and spare line S1 and a counterclockwise line W2 and spare line S2. The nodes N1 to N5 comprise a cross-connection apparatus for switching signals in changing connection to a spare line upon occurrence of a fault, as will be described above.

If a fault occurs between the nodes N2 and N3 on the counterclockwise line W2, the node N3 switches an input point L1 to an input point L2 at the same time as fault detection and receives a signal from the spare line S2. Since a signal identical to that on the line W2 is transmitted through the spare line S2, signal disconnection can be avoided by this connection switching. Connection can be switched at a high speed upon occurrence of a fault by storing the connection switching as connection information in a memory in advance. The nodes N1 to N5 of the ring network to which the present invention is applied will be described in detail.

FIG. 2 shows the nodes N1 to N5 shown in FIG. 1. Referring to FIG. 2, a switch 101 i s a cross-connection apparatus capable of arbitrarily cross-connecting a plurality of input points to a plurality of output points. In this embodiment, N input points $R_{W11}$ to $R_{W1N}$ corresponding to the clockwise line W1, N input points $R_{S11}$ to $R_{S1N}$ corresponding to the spare line of the line W1, M input points $R_{W21}$ to $R_{W2M}$ corresponding to the counterclockwise line W2, and M input points $R_{S21}$ to $R_{S2M}$ corresponding to the spare line of the line W2 are set.

Output points $T_{W11}$ to $T_{W1N}$, $T_{S11}$ to $T_{S1N}$, $T_{W21}$ to $T_{W2M}$ and $T_{S21}$ to $T_{S2M}$ are respectively set in correspondence with these input points. Although not shown, other input and output points are set and can be arbitrarily connected.

The clockwise lines W1 and S1 and the counterclockwise lines W2 and S2 are connected to the switch 101 via fault detectors 102 to 105. The fault detectors 102 to 105 monitor occurrence of faults on the sublines of the lines W1, S1, W2, and S2, and upon occurrence of faults, inform a CPU (Central Processing Unit) 106 of fault detection information. For example, the fault detector 102 monitors signals on the respective sublines of the clockwise line W1, i.e., at the N input points $R_{W11}$ to $R_{W1N}$, and if faults occur in signals at, e.g., the input points $R_{W11}$ and $R_{W12}$, informs the CPU 106 of this. The remaining fault detectors 103 to 105 also similarly operate.

The CPU 106 determines the type of fault in accordance with fault detection information output from the fault detectors 102 to 105, and refers to connection information stored in a connection information table 107 to determine connection switching by the switch 101. In the connection information table 107, normal connection information and all fault occurrence connection information for the switch 101 are stored as tables, as will be described below. That is, the connection information table 107 typically comprises connection destination tables 107a and a normal connection table 107b.

The CPU 106 executes a program stored in a ROM (Read Only Memory) 108 in advance to control transmission and switching at the node. Needless to say, the CPU 106 is connected via an address bus and a data bus to necessary devices including the switch 101, the fault detectors 102 to 105, the connection information table 107, the ROM 108, and a RAM (not shown).

The program stored in the ROM includes a fault specifying program for specifying the type of fault from the types of input line faults defined in advance when a fault occurs on an input line, a search program for searching, for connection destination information corresponding to the specified type of fault, the connection information table 107 in which connection destination information indicating the connection state of the switch 101 is stored in accordance with the type of fault, and a switching control program for switching the connection state of the switch 101 in accordance with the found connection destination information.

Figure 3:
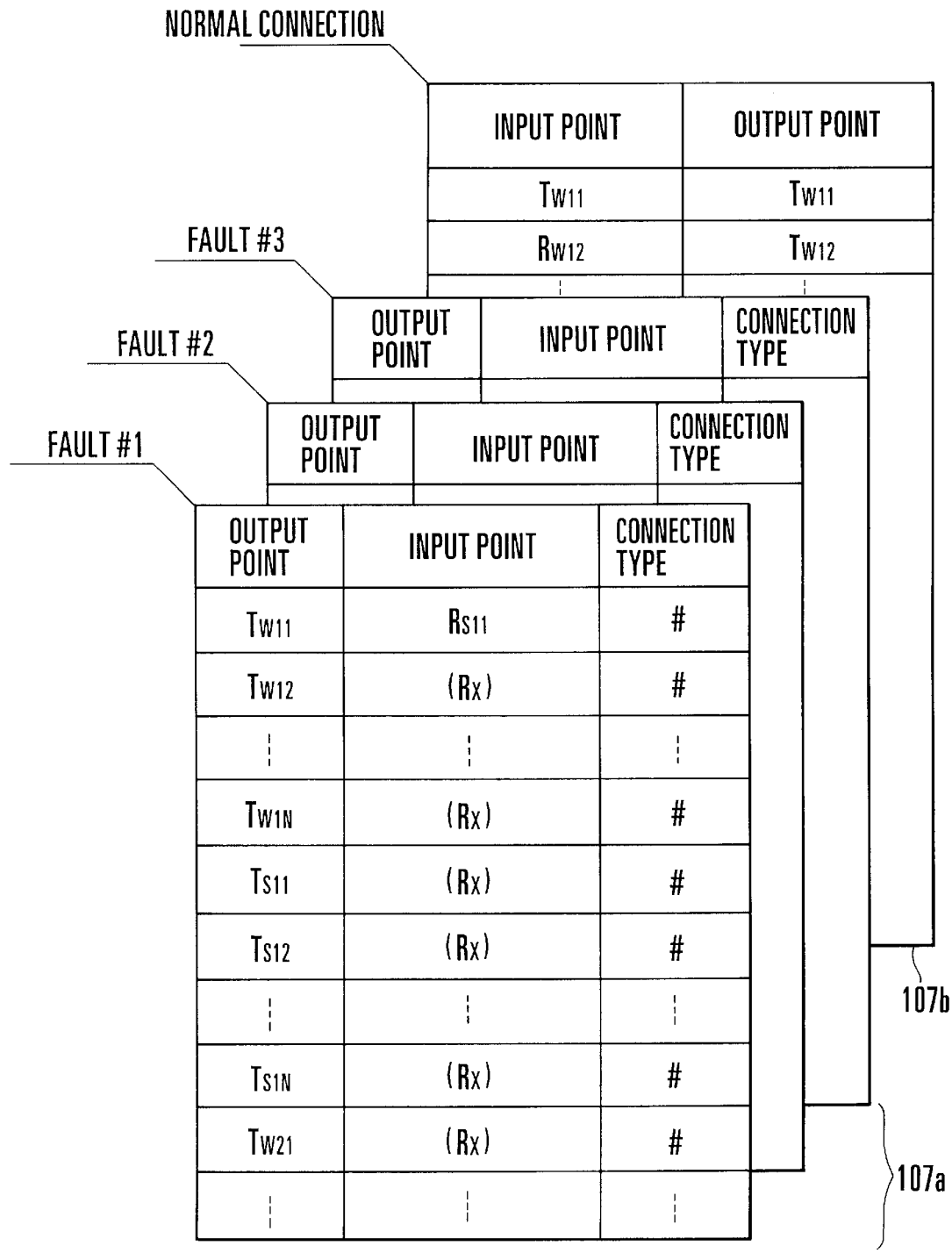
FIG. 3 is a schematic view of a connection destination table in which the contents of a connection information table shown in FIG. 2 are classified by the types of faults.

FIG. 3 schematically shows the connection destination tables 107a in which the contents of the connection information table 107 shown in FIG. 2 are classified by the types of faults, and the normal connection table 107b representing the relationship between input points and output points in normal connection. Referring to FIG. 3, in each connection destination table 107a, setting information such as connectable input points and connection types are stored in advance in correspondence with the respective output points of the switch 101. One input point can correspond (be connected) to a plurality of output points. The connection type is a parameter for classifying connection manners for realizing complicated signal paths on a network with a combination of input and output points. The connection type is set for each output point.

In FIG. 3, the normal connection table 107b stores information representing the connection relationship between input points and output points in normal connection. By referring to the normal connection table 107b, an output point corresponding to a faulty input point can be obtained.

The fault # indicates the type of fault such as a single fault or multiple faults, and is particularly defined by the degree of multiple faults in advance. By setting one connection destination table for one type of fault, the CPU 106 can determine a switching destination point from the type of fault (fault #) and a faulty point.

FIG. 4 schematically shows a table storing information serving as a base for forming the connection destination table 107a and the normal connection table 107b shown in FIG. 2. A connection definition table corresponding to the type of fault is stored for each connection type. In this table, information are classified by numerical values called plane numbers # for the sake of simplicity. In FIG. 4, plane number #0 indicates normal connection information in respective connection types; plane number #1, a connection definition table for fault #1 in respective connection types; and plane number #2, a connection definition table for fault #2 in respective connection types. Similarly, a connection definition table for each fault is defined by each plane number.

From these information, a plurality of connection destination tables 107a and the normal connection table 107b are formed in advance in the format shown in FIG. 3 and stored in the connection information table 107. That is, the connection destination tables 107a and the normal connection table 107b in FIG. 3 are formed in advance by collecting connection definition tables for each fault # (plane number #) in FIG. 4.

The CPU 106 can therefore specify a connection destination table 107a, and an output point corresponding to a faulty input point from the normal connection table 107b only by determining the type of fault (i.e., fault #). From the specified connection destination table 107a and the specified output point, the CPU 106 can determine a switching destination input point.

Figure 5:
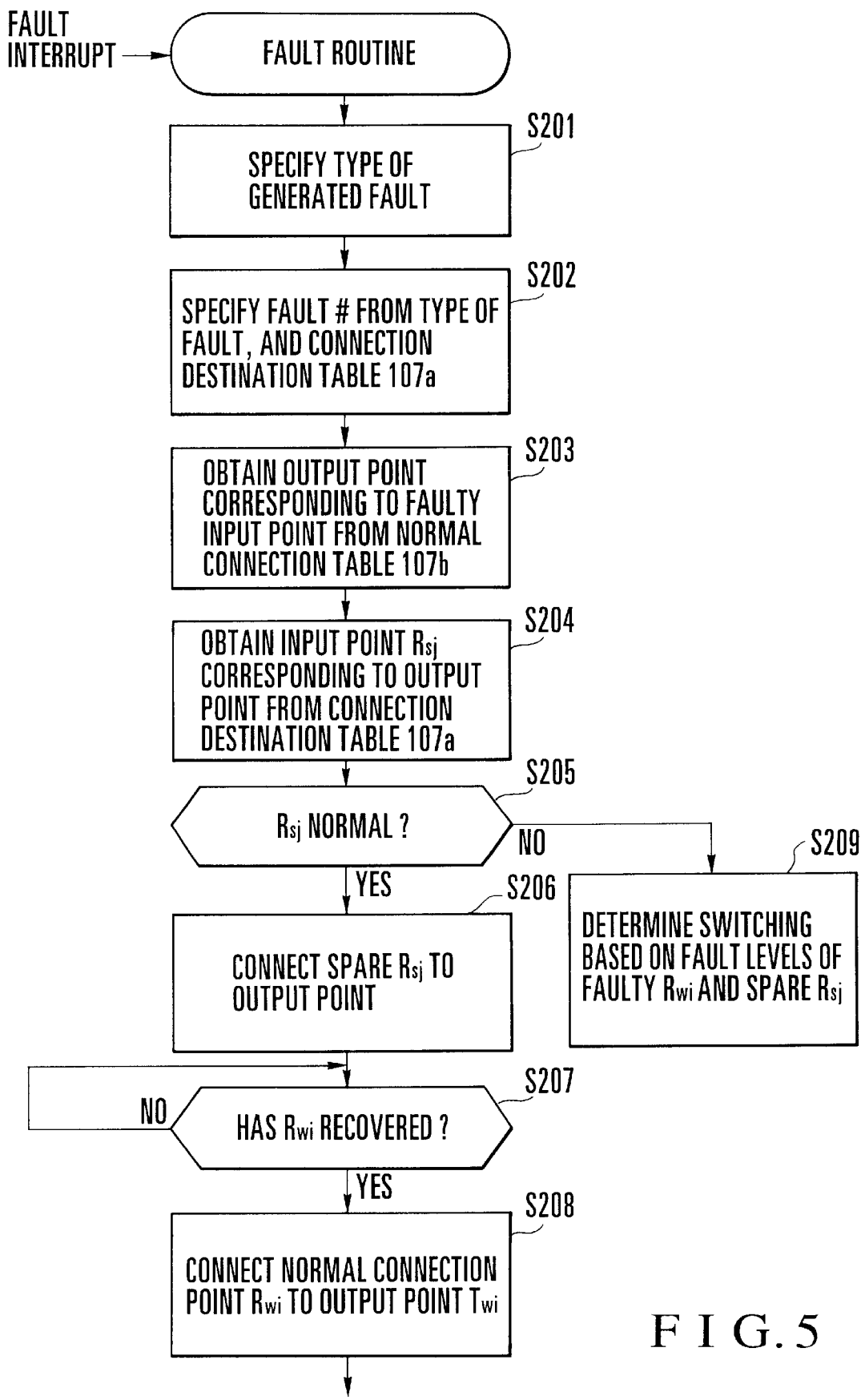
FIG. 5 is a flow chart for explaining connection switching at the node shown in FIG. 2.

FIG. 5 shows a flow chart for explaining the operation of this embodiment. When a fault interrupt is generated from at least one of the fault detectors 102 to 105, the CPU 106 calls a fault routine and specifies the type of generated fault (e.g., the presence/absence of multiple faults indicating whether this fault is the first one or another fault has already existed, and a combination of multiple faults generated) (step S201).

The CPU 106 specifies fault # from the type of fault (step S202), and a connection destination table 107a from the specified fault # (step S203).

The CPU 106 obtains an output point corresponding to a faulty input point with reference to the normal connection table 107b, and reads out a spare input point $R_{Sj}$ corresponding to the output point from the connection destination table 107a specified by fault # (step S204).

The CPU 106 checks whether the connection destination point $R_{Sj}$ is normal, in accordance with information from the fault detectors 102 to 105 which corresponds to the readout connection destination point $R_{Sj}$ (step S205). If YES in step S205, the CPU 106 switches the switch 101 to connect the spare connection destination point $R_{Sj}$ to the output point (step S206). In this manner, the CPU 106 can switch the faulty input point to the spare connection destination point $R_{Sj}$ only by referring to the connection information table 107.

The CPU 106 checks whether the faulty input point, e.g., an input point $R_{Wi}$ has recovered (step S207). If YES in step S207, the CPU 106 connects the input point $R_{Wi}$ to an output point $T_{Wi}$ to restore the switch 101 to normal connection (step S208).

If NO in step S205, the CPU 106 compares the fault level of the faulty input point $R_{Wi}$ with that of the connection destination point $R_{Sj}$ to determine either one of them as a switching destination point (step S209).

Connection switching by the switch 101 will be explained with reference to FIG. 6. For the sake of descriptive simplicity, the case wherein a single fault (fault #1) occurs at the input point $R_{W11}$ of the clockwise line W1 in the ring network shown in FIG. 1.

As described above, the connection information table 107 comprises the fault occurrence connection information table in addition to the normal connection information table. As shown in FIG. 3, the output point $T_{W11}$ is connected to the input point $R_{W11}$ in normal connection (connection L1), and to the input point $R_{S11}$ upon occurrence of fault #1 (connection L2).

When the CPU 106 detects occurrence of fault #1 at the input point $R_{W11}$, it specifies the output point $T_{W11}$ corresponding to the input point $R_{W11}$ from the normal connection table. Then, the CPU 106 determines a connection destination table 107a having a plane number corresponding to fault #1, and refers to the connection destination table 107a to determine the spare connection destination point $R_{S11}$. After confirming that the spare connection destination point $R_{S11}$ is normal, the CPU 106 switches the switch 101 from the normal connection L1 to the spare connection L2 upon occurrence of a fault.

Even when multiple faults occur, the CPU 106 can uniquely determine connection destination points by referring to the connection information table 107 in accordance with the fault #. Therefore, the CPU 106 can switch connection only by confirming the presence/absence of multiple faults and referring to the connection information table. Even upon occurrence of multiple faults, connection switching can be completed within a very short time.

Note that the connection type is used as a connection destination table determination parameter. However, when the connection destination table is shared by the fault # regardless of the connection type, like the above embodiment, the connection type need not be used as a connection destination table determination parameter. In this case, the connection destination table can be immediately determined from the fault #. In the above embodiment, the connection destination table is shared by the fault # regardless of the connection type. However, different connection destination tables may be used for respective connection types even with the same fault #.

As has been described above, according to the present invention, since connection destination information corresponding to the type of fault is stored in a memory in advance, the connection state of the switch can be uniquely determined only by referring to the memory upon occurrence of an actual fault. Therefore, connection can be switched at a high speed without calculating the connection destination by a conventional firmware program. Particularly, if connection destination information is defined and stored in the memory in advance in accordance with the number of multiple faults, connection can be switched at a high speed even upon occurrence of multiple faults.

What is claimed is:

1. A connection switching method of a switch for selectively setting a connection path between a plurality of input lines and a plurality of output lines, comprising the steps of:
    defining types of faults which may occur on said input lines;
    storing connection destination information indicating connection states of said switch in accordance with the types of faults;
    specifying the type of fault on the basis of the defined types of faults when a fault occurs on an input line;
    reading out connection destination information corresponding to the specified type of fault; and
    switching the connection state of said switch on the basis of the readout connection destination information.

2. A method according to claim 1, wherein the connection destination information indicates a connection destination input line for an output line connected to a faulty input line in normal connection.

3. A method according to claim 1, wherein the step of defining the type of fault comprises defining the type of fault in advance in accordance with a single fault and the number of multiple faults.

4. A connection switching method of a switch arranged at a node of a ring network to selectively set a connection path between a plurality of input lines, spare lines of said input lines, a plurality of output lines, and spare lines of said output lines, comprising the steps of:
    defining types of faults which may occur on said input lines;
    storing connection destination information indicating spare line connection of said switch in accordance with the types of faults;
    specifying the type of fault on the basis of the defined types of faults when a fault occurs on an input line;
    reading out connection destination information corresponding to the specified type of fault; and
    switching said switch to a corresponding spare line on the basis of the readout connection destination information.

5. A method according to claim 4, wherein the connection destination information indicates a spare connection destination input line for an output line connected to a faulty input line in normal connection.

6. A method according to claim 4, wherein the step of defining the type of fault comprises defining the type of fault in advance in accordance with a single fault and the degree of multiple faults.

7. A connection switching apparatus arranged at each of a plurality of nodes constituting a network, said nodes being connected to each other in the network, comprising:
    a switch for selectively setting a connection path between a plurality of input lines and a plurality of output lines;
    memory means for storing connection destination information indicating connection states of said switch in accordance with predefined types of faults which may occur on said input line;
    a plurality of monitor means for individually monitoring occurrence of faults on said input lines; and
    control means for specifying the type of fault detected by said monitor means on the basis of the defined types of faults, reading out connection destination information corresponding to the specified type of fault from said memory means, and switching the connection state of said switch.

8. An apparatus according to claim 7, wherein the connection destination information indicates a connection destination input line for an output line connected to a faulty input line in normal connection.

9. An apparatus according to claim 8, wherein said memory means comprises a connection destination table in which connection destination information for specifying at least one input line in correspondence with each of said output lines is stored for each type of fault.

10. An apparatus according to claim 7, wherein the type of fault is defined in advance in accordance with a single fault and the number of multiple faults.

11. A storage medium which stores a program for executing a processor to control a switch for selectively setting a connection path between a plurality of input lines and a plurality of output lines,
    the program having
    a fault specifying program for specifying the type of fault from predefined types of faults which may occur on said input lines when a fault occurs on an input line,
    a search program for searching, for connection destination information corresponding to the specified type of fault, a memory in which connection destination information indicating a connection state of said switch is stored in accordance with the type of fault, and
    a switching control program for switching the connection state of said switch in accordance with the found connection destination information.

12. A medium according to claim 11, wherein the type of fault is defined in advance in accordance with a single fault and the number of multiple faults.

* * * * *